United States Patent [19]

Syrowik

[11] Patent Number: 4,771,854
[45] Date of Patent: Sep. 20, 1988

[54] BELT WINDING BRAKE FOR PASSIVE BELT RETRACTOR

[75] Inventor: Glenn F. Syrowik, Sterling Heights, Mich.

[73] Assignee: General Motors Corporation, Detroit, Mich.

[21] Appl. No.: 105,350

[22] Filed: Oct. 7, 1987

[51] Int. Cl.$^4$ ............................................. B60R 21/10
[52] U.S. Cl. .................................. 180/268; 180/286; 280/806; 280/807
[58] Field of Search ...................... 280/801, 806, 807; 180/268, 286

[56] References Cited

U.S. PATENT DOCUMENTS

| | | | |
|---|---|---|---|
| 3,190,574 | 6/1965 | Purzycki | 242/55 |
| 3,866,944 | 2/1975 | Takahshi | 180/286 |
| 4,478,433 | 10/1984 | Taguchi et al. | 180/268 |
| 4,553,625 | 11/1985 | Tsuge et al. | 180/268 |
| 4,630,841 | 12/1988 | Nishimura et al. | 180/268 |

Primary Examiner—Kenneth R. Rice
Attorney, Agent, or Firm—Charles E. Leahy

[57] ABSTRACT

A door mounted seat belt retractor has a spring biased reel winding the passive seat belt during closing movement of the door. An inertia locking mechanism locks the reel in response to a sensed acceleration condition. A brake level pivotally mounted on the retractor bears upon the outermost layer of belt wound on the reel to retard the windup of the belt as the door approaches the closed position to prevent the belt from being overly wound on the reel simultaneous with the occurrence of a door slam actuated locking of the reel. The brake lever is pivotally mounted on the retractor and includes a belt follower portion which causes the lever to be progressively pivoted as the windup of the belt progresses from the door open position to the door closed position. The lever has a belt braking portion which engages with the belt as the belt approaches the fully wound condition corresponding to closure of the door. An inertia weight is preferably carried by the brake lever distant from the pivotal mount of the brake lever on the retractor in order to impart a belt braking force which is proportional to the acceleration experienced by the door mounted retractor.

5 Claims, 2 Drawing Sheets

BELT WINDING BRAKE FOR PASSIVE BELT RETRACTOR

The invention relates to a door mounted inertia sensitive seat belt retractor in a passive seat belt system and more particularly provides a brake adapted to retard the belt winding rotation of the reel as the door reaches the closed position so that the reel is not locked with the belt in an overwound condition.

BACKGROUND OF THE INVENTION

It is well known in vehicle seat belts to provide a passive seat belt system in which the outboard end of the seat belt is mounted on the vehicle door by a door mounted retractor so that the retractor winds the belt about the occupant when the door is closed. Opening movement of the door unwinds the belt and carries the belt outwardly and forwardly with respect to the seated occupant to permit ingress and egress. The door mounted retractor has an inertia locking mechanism associated therewith to lock the reel against belt unwinding rotation in response to a sensed acceleration condition. Such an inertia locking mechanism typically includes a lock bar which rests upon an inertia mass with the inertia mass becoming excited by the acceleration condition and moving the lock bar into engagement with ratchet teeth carried on the reel.

When an occupant closes the door, the door and the retractor are rapidly decelerated as the door reaches the closed position. This deceleration induces an intermittent locking of the inertia locking mechanism. A weatherstrip interposed between the door opening and the door is compressed during such deceleration of the door to effectively cushion and quiet the closure of the door. The compression of the weatherstrip coupled with any other compliance built into the door, permits the retractor to travel somewhat inwardly beyond its normal door closed position. Then, the weatherstrip compression pushes the door outwardly to its normal closed position established by the door latch.

The present invention provides a brake adapted to retard the windup of the belt on the reel so that the belt is not overwound during the door overtravel permitted by compression of the weatherstrip so that the belt is not locked in its overwound condition during the intermittent actuation of the reel locking mechanism as the door reaches the fully closed position.

SUMMARY OF THE INVENTION

A door mounted seat belt retractor has a spring biased reel winding the passive seat belt during closing movement of the door. An inertia locking mechanism locks the reel in response to a sensed acceleration condition. A brake lever pivotally mounted on the retractor bears upon the outermost layer of belt wound on the reel to retard the windup of the belt as the door approaches the closed position to prevent the belt from being overly wound on the reel simultaneous with the occurrence of a door slam actuated locking of the reel. The brake lever is pivotally mounted on the retractor and includes a belt follower portion which causes the lever to be progressively pivoted as the windup of the belt progresses from the door open fully unwound condition to the door closed position. The lever has a belt braking portion which engages with the belt as the belt approaches the fully wound condition corresponding to closure of the door. An inertia weight is preferably carried by the brake lever distant from the pivotal mount of the brake lever on the retractor in order to impart a belt braking force which is proportional to the acceleration experienced by the door mounted retractor.

BRIEF DESCRIPTION OF THE DRAWINGS

These and other features will be readily apparent from the following specification and drawings wherein.

DESCRIPTION OF THE PREFERRED EMBODIMENT

Figure 1:
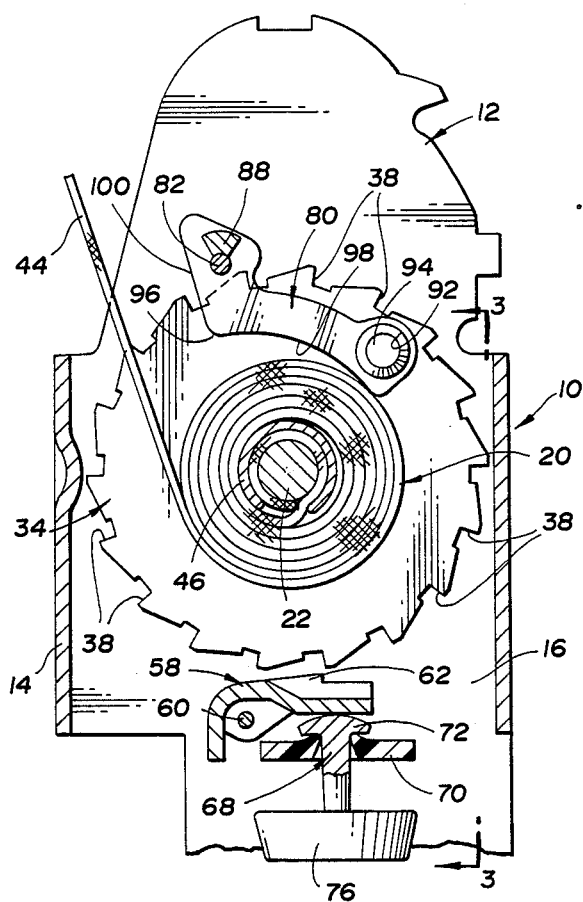
FIG. 1 is a side elevational view of a door mounted seat belt retractor according to the invention showing the belt substantially unwound from the retractor when the door is open.
Figure 3:
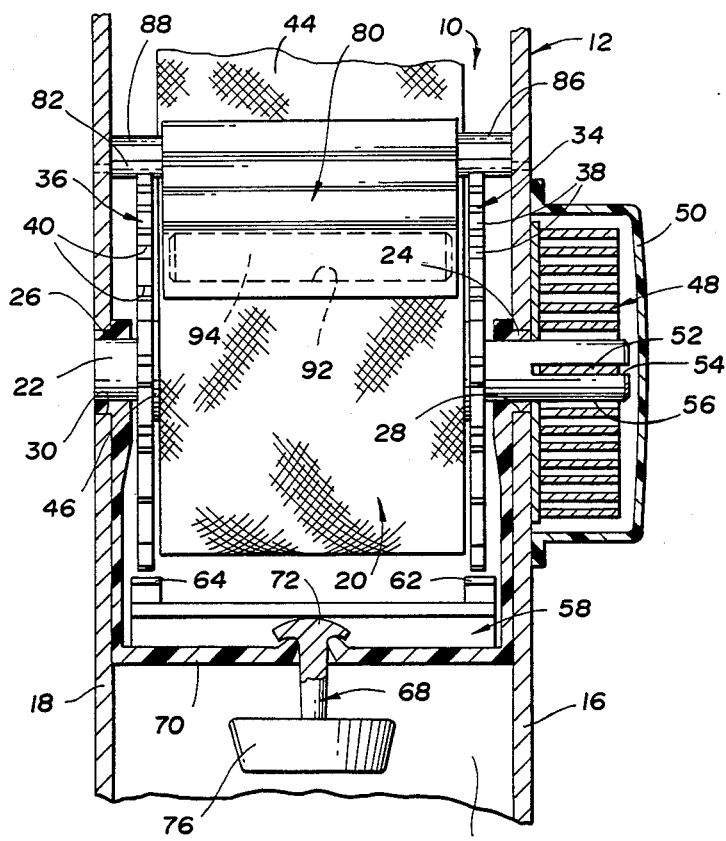
FIG. 3 is a front elevation view taken in the direction of arrow 3—3 of FIG. 1 and showing the brake lever overlying the outermost layer of belt wound upon the reel.

Referring to FIG. 1, there is shown a seat belt retractor adapted for mounting on the door of a vehicle body for winding a seat belt, which may be either a lap belt or a shoulder belt. The retractor 10 includes a frame 12 having a base wall 14 and laterally spaced side walls 16 and 18. A belt reel generally indicated at 20 is journaled upon the frame 12 by a reel shaft 22. As best seen in FIG. 3, the ends of the reel shaft are received in bushings 24 and 26 mounted in apertures 28 and 30 provided respectively in the side walls 16 and 18. A pair of ratchet plates 34 and 36 are mounted on the reel shaft 22 and have a plurality of ratchet teeth 38 and 40 respectively displayed about their circumferences.

A restraint belt 44, which may be either a lap belt or a shoulder belt, is suitably attached to the reel shaft 22 via a spool 46 extending between the ratchet plates 34 and 36 and is wound upon the reel shaft. A spiral windup spring 48 is contained within spring housing 50 and has its inner end 52 seated within a slot 54 in the end of reel shaft 22 and an outer end, not shown, suitably anchored on spring housing 50 so that the windup spring 48 acts to bias the belt reel 20 in the belt winding direction of rotation.

As best seen in FIGS. 1 and 3, the inertia locking mechanism for the reel includes a lock bar 58 pivotally mounted on the housing 12 by a pivot pin 60 and having locking teeth 62 and 64 which are engageable with the ratchet teeth 38 and 40 of the ratchet plates 34 and 36.

A pendulum 68 is mounted on a pendulum support 70 and includes a head 72 supporting the lock bar 58 at a normal rest position shown in FIG. 1 in which the locking teeth 62 and 64 of the lock bar are spaced away from the ratchet plates 34 and 36 to permit belt unwinding rotation of the reel. The pendulum 68 includes an inertia weight 76 which causes the pendulum 68 to tilt in response to an acceleration condition so that the head 72 raises the lock bar 58 into engagement with the ratchet plates 34 and 36 of the belt reel 20.

When the occupant closes the vehicle door, the retractor 10 is rapidly decelerated when the door reaches the closed position. This deceleration upsets the pendulum 68 and raises the lock bar into engagement with the ratchet wheel teeth 38 and 40. Furthermore, the rapid closing of the door causes the weatherstrip interposed between the door opening and the door to be compressed so that the door and the retractor 10 travel further inboard than the normal closed position of the door.

A brake mechanism is provided to retard the belt winding rotation of the reel 20 so that the belt is not locked by the inertia mechanism in the overly wound condition permitted by door overtravel as the weatherstrip is compressed.

The brake mechanism is provided by a brake lever 80 which spans the space between ratchet plates 34 and 36 and overlies the belt wound upon the reel 20. The brake lever 80 is pivotally mounted on the frame 10 by a pivot shaft 82 which extends through a bore in the brake lever 80 and into aligned apertures in the side walls 16 and 18 of the housing 12. The brake lever 80 is preferably of molded plastic and includes projections 86 and 88 which project into engagement with the side walls 16 and 18 to retain the brake lever 80 at a centered position shown in FIG. 3, overlying the reel 20.

Figure 2:
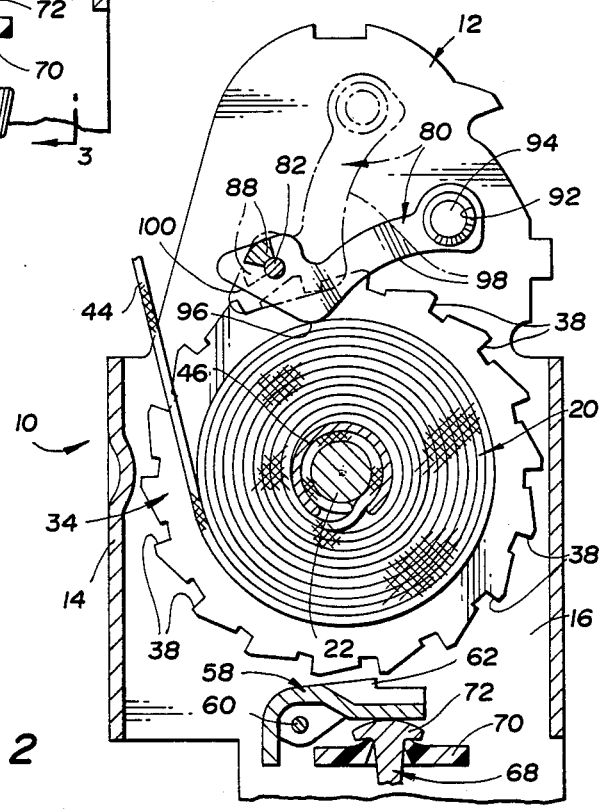
FIG. 2 shows the brake lever acting to substantially retard the belt rate of belt winding rotation of the reel and also shows in phantom line the belt fully wound upon the reel when a release buckle is released.

The end of the brake lever 80 opposite the pivot pin 82 has a cylindrical bore 92 which receives a inertia weight 94 which is conveniently provided by a metal rod. As best seen in FIGS. 1 and 2, the underside of the brake lever 80 includes an arcuate belt follower portion 98, a planar belt follower portion 100 which extends generally normal to the arcuate follower portion 98, and a brake surface 96 intermediate the portions 98 and 100.

OPERATION

FIG. 1 shows the retractor with the belt substantially completely unwound from the retractor, as occurs when the vehicle door is fully opened. The brake lever 80, particularly the arcuate follower portion 98 thereof, is resting upon the outermost layer of the belt 44 wound upon the reel 20. As the vehicle occupant moves the door from the fully open position toward the closed position, the windup spring 48 rotates the reel 20 in the belt winding counterclockwise direction of rotation, as viewed in FIG. 1, to store the belt 44 on the reel.

As the door closure progresses, the belt winding progresses and the brake lever 80 is progressively pivoted about its pivot shaft 82 by the progressively increasing diameter of belt wound upon the reel 20. As best seen in FIG. 1, it is understood that the acceleration experienced by the door in the door closing direction acts upon the inertia weight 94 in the direction to diminish the load of the brake lever 80 acting on the outermost layer of belt thereby lessening the braking effect which the brake lever might have upon the winding rotation of the spool 20.

As the door approaches the closed position, for example, during the last six inches of its travel, the belt winding upon the reel will have progressed to the point at which the brake lever 80 has been raised about the pivot 82 from the position of FIG. 1 to the solid line indicated position of FIG. 2. At this position of pivotal movement of the brake lever 80, the braking surface 96 begins to contact the growing diameter of webbing wound upon the reel and begins to retard the winding rotation of the reel by the imposition of friction and clamping forces against the outermost layer of belt. Simultaneously, as seen in FIG. 2, the inertia weight 94 is seen to have been carried above the brake levers' center of rotation defined by the shaft 82. Thus, the inertia force imposed on the inertia weight 94 as the door accelerates toward its closed position induces a clockwise moment upon the brake lever 80 to increase the force with which the braking surface 96 acts against the outermost layer of belt.

When the door reaches the fully closed position, the compression of the weatherstrip permits the retractor 10 to move inboard the vehicle while at the same time rapidly decelerating the door and upsetting the pendulum 68 to raise the lock bar 58 into engagement with the ratchet plates. However, because the brake lever has retarded the rate of belt winding rotation, the belt 44 continues to have a degree of slackened relation which the windup spring 48 will remove by continuing to rotate the reel 20 in the belt winding direction. Thus, the locking teeth 62 and 64 of the lock bar will engage with the angled back sides of the ratchet teeth 38 and 40 and be returned to the normal rest position of FIGS. 1 and 2 as the energy stored in the compressed weatherstrip urges the door outboard to its normal closed position established by the door latch. As the door decelerates upon its contact with the weatherstrip, the inertia force acting on the inertia weight 94 imparts a counterclockwise moment to the brake lever 80 to unload the braking portion 96 of the brake lever from contact with the belt reel to enable the continued winding rotation of the reel 20 by the windup spring 48.

It will be understood that the passive seat belt system of the aforedescribed type commonly employs a release buckle interposed in the belt 44, at the attachment of the inboard end of the buckle to the vehicle body. When the release buckle is released the windup spring 48 rotates the reel 20 further in the belt winding direction to completely store the belt 44 on the reel as shown in phantom-line FIG. 2. During such continuing windup of the belt 44 on the reel, the outermost layer of belt contacts with the planar belt follower portion 100 of the brake lever 80 and raises the brake lever 80 to its stored position of FIG. 2.

Thus it is seen that the invention provides a new and improved door mounted inertia sensitive seat belt retractor having a brake means associated therewith adapted to slow the windup of the belt on the reel as the door approaches the closed position to prevent the belt from being overly wound on the reel concomitant with a door slam actuated locking of the reel.

It will be understood that the aforedescribed preferred embodiment of the invention is merely exemplary of the invention and that the scope of the invention is defined by the appended claims.

The winding brake is not limited to the particular shape and construction shown in the drawings. For example, the brake lever 80 need not follow the diameter of the belt from the unwound condition shown in FIG. 1 but rather the brake lever could be held at a poised position above the belt by a stop surface provided on the retractor frame 12. Furthermore, it will be understood that the location and size of the inertia weight 94 mounted upon the brake lever 80 is determined according to the characteristics of a particular seat belt system, taking into account such variables as the effort of the windup spring, diameter of the belt reel, compressibility of the weatherstrip, and acceleration characteristics of the door during its closing movement.

The embodiments of the invention in which an exclusive property or privilege is claimed are defined as follows:

1. In a seat belt retractor mounted on a door and having a spring biased reel for winding a passive restraint belt about an occupant upon closing of the door, and an acceleration responsive reel locking mechanism subject to actuation when the door is slammed, the improvement comprising:

a brake means associated with the retractor and adapted to slow the windup of the belt on the reel as the door reaches the closed position to prevent the belt from being over wound on the reel concomitantly with the door slam actuated locking of the reel.

2. In a seat belt retractor mounted on a door and having a spring biased reel for winding a passive restraint belt about an occupant upon closing of the door, and an acceleration responsive reel locking mechanism subject to actuation when the door is slammed, the improvement comprising:

a brake lever pivotally mounted on the retractor and having a brake engageable with the outermost layer of belt wound upon the reel at least as the door approaches the closed position and adapted to slow the windup of the belt on the reel as the door reaches the closed position to prevent the belt from being over wound on the reel concomitantly with the door slam actuated locking of the reel.

3. In a seat belt retractor mounted on a door and having a spring biased reel for winding a passive restraint belt about an occupant upon closing of the door, and an acceleration responsive reel locking mechanism subject to actuation when the door is slammed, the improvement comprising:

a brake lever pivotally mounted on the retractor, said lever having a belt follower portion engaging with the outermost layer of belt wound upon the reel and causing the lever to be progressively pivoted as the wind up of the belt progresses during door closing movement, and said lever having a belt braking portion engaging with the outermost layer of belt wound upon the reel as the belt approaches the fully wound condition corresponding to closure of the door and substantially retarding the windup of the belt on the reel as the door approaches the closed position to prevent the belt from being over wound on the reel concomitantly with the door slam actuated locking of the reel.

4. In a seat belt retractor mounted on a door and having a spring biased reel for winding a passive restraint belt about an occupant upon closing of the door, and an acceleration responsive reel locking mechanism subject to actuation when the door is slammed, the improvement comprising:

a brake lever pivotally mounted on the retractor, said lever having a belt braking portion engaging with the outermost layer of belt wound upon the reel as the belt approaches the fully wound condition corresponding to full closure of the door, and an inertia weight carried by the brake lever distant from the pivotal mount of the brake lever on the retractor and being effected by acceleration forces to cause the brake lever to substantially retard the windup of the belt on the reel as the door approaches the closed position to prevent the belt from being overly wound on the reel simultaneous with door slam actuated locking of the reel.

5. In a seat belt retractor mounted on a door and having a spring biased reel for winding a passive restraint belt about an occupant upon closing of the door, and an acceleration responsive reel locking mechanism subject to actuation when the door is slammed, the improvement comprising:

a brake lever pivotally mounted on the retractor, said lever having a belt follower portion engaging with the outermost layer of belt wound upon the reel and causing the lever to be progressively pivoted as the wind up of the belt progresses during door closing movement, and said lever having a belt braking portion engaging with the outermost layer of belt wound upon the reel as the belt approaches the fully wound condition corresponding to full closure of the door, and an inertia weight carried by the brake lever distant from the pivotal mount of the brake lever on the retractor and being effected by acceleration forces to cause the brake lever to substantially retard the windup of the belt on the reel as the door approaches the closed position to prevent the belt from being overly wound on the reel simultaneous with door slam actuated locking of the reel.

* * * * *